United States Patent [19]

Ochi et al.

[11] Patent Number: 4,788,598
[45] Date of Patent: Nov. 29, 1988

[54] CODING METHOD AND APPARATUS

[75] Inventors: Hiroshi Ochi; Makoto Kobayashi, both of Yokosuka; Hisashi Ibaraki; Tetsuji Yamamoto, both of Kanagawa, all of Japan

[73] Assignee: Nippon Telegraph and Telephone Corp., Tokyo, Japan

[21] Appl. No.: 924,052

[22] Filed: Oct. 28, 1986

[30] Foreign Application Priority Data

Oct. 28, 1985 [JP] Japan .......................... 60-239347

[51] Int. Cl.⁴ .............................................. H04N 1/40
[52] U.S. Cl. ..................................... 358/260; 358/280; 358/282; 358/283; 382/56
[58] Field of Search ............... 358/280, 282, 283, 256, 358/260; 382/53, 56; 340/347 AD, 347 CC

[56] References Cited

U.S. PATENT DOCUMENTS

| | | | |
|---|---|---|---|
| 4,525,747 | 6/1985 | Sakai et al. | 382/53 |
| 4,554,593 | 11/1986 | Fox et al. | 350/282 |
| 4,577,235 | 3/1986 | Kammapell et al. | 358/282 |
| 4,578,715 | 3/1986 | Yamaguchi | 358/282 |
| 4,644,410 | 2/1987 | Schlichtig | 358/282 |

Primary Examiner—Edward L. Coles, Sr.
Attorney, Agent, or Firm—Roberts, Spiecens & Cohen

[57] ABSTRACT

A coding method includes the steps of dividing an image into a plurality of blocks each consisting of a plurality of picture elements, dividing gray scale information of each intrablock picture element into three components, i.e, (1) a reference level representing a position of a signal level of an intrablock picture element in a whole dynamic range of gray scale representation, (2) a level difference representing a distribution range of the signal levels of the intrablock picture elements, and (3) a level designating signal representing a level of each intrablock picture element within the distribution range, and independently coding the three components.

25 Claims, 12 Drawing Sheets

FIG.5(A)
FIG.5(B)
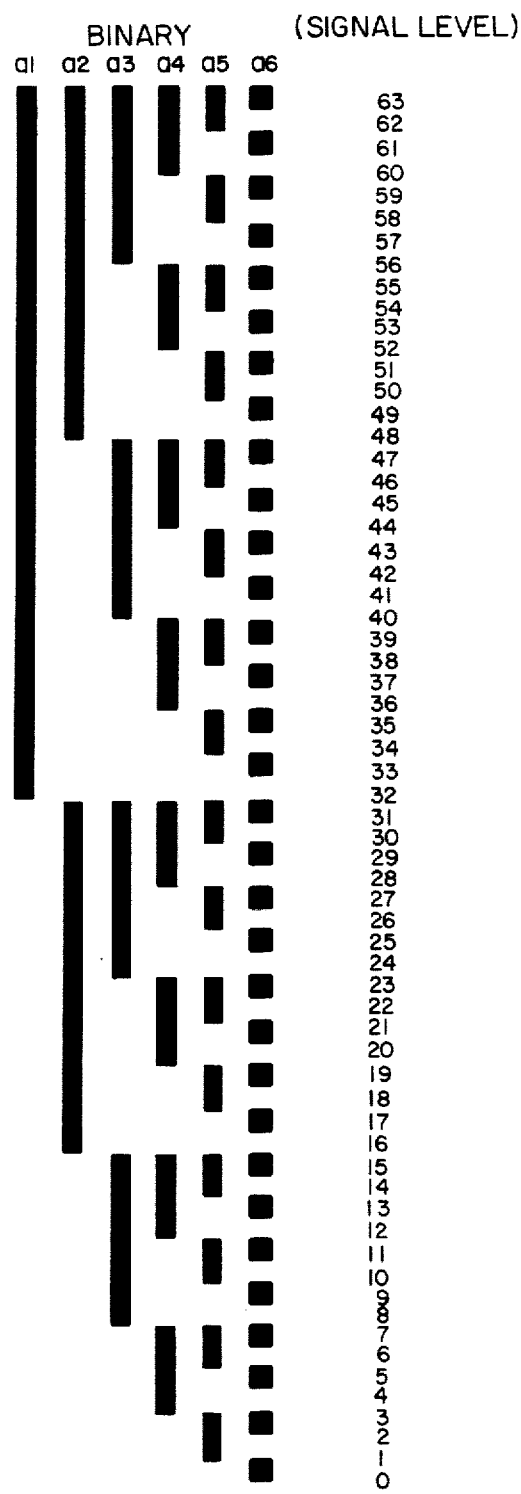
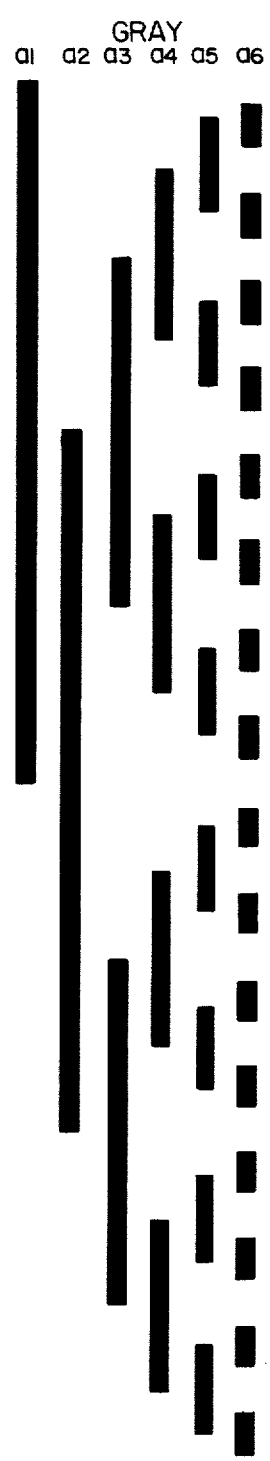

CODING METHOD AND APPARATUS

BACKGROUND OF THE INVENTION

1. Field of the Invention

The present invention relates to a method and apparatus for efficiently coding a continuous tone image.

2. Description of the Prior Art

Bit plane coding is a conventional coding scheme of the type described above. According to this scheme, an n-bit signal represents $2^n$ gray scale levels. An Mth (M=1 to n) bit signal of each picture element is coded as one imaginary image when each gray scale level is represented by a binary number.

Another conventional coding scheme is block truncation coding. According to this coding scheme, an image is divided into blocks each consisting of $K_1 \times K_2$ picture elements. An average value $P_0$ of the signal levels is calculated for each block. The signal level of a given picture element, which exceeds the average value $P_0$, is replaced with an average value $P_1$ of such picture elements. The signal level of another given picture element, which is below the average value $P_0$, is replaced with an average value $P_2$ of such picture elements. The picture element information is then approximated and coded on the basis of the two levels represented by the average values $P_1$ and $P_2$, and its position data.

In $2^n$ gray scale representation in the conventional bit plane coding scheme, n imaginary images constituted by each bit are coded as a black or white image represented by "1" or "0". This scheme can be realized by using a plurality of black-and-white image coding circuits. It is difficult to achieve coding with this method with high efficiency.

Since each block information is represented by two levels in the conventional block truncation coding scheme, coding with high efficiency can be achieved. However, the gray scale levels are limited to two levels, and requirements for high image quality cannot be satisfied.

SUMMARY OF THE INVENTION

It is an object of the present invention to provide a coding method and apparatus capable of solving the conventional problems and achieving high-speed coding with high efficiency.

It is another object of the present invention to provide a coding method and apparatus capable of satisfying wide-range requirements from precise image coding requiring a very large number of data to coarse image coding requiring a very small number of data by slightly changing the coding arrangement.

It is still another object of the present invention to provide a hierarchical coding method and apparatus capable of legibly extracting general information representing only a character or continuous tone image portion without decoding all coded signals.

According to a coding method of the present invention, an image is divided into a plurality of blocks each consisting of a plurality of picture elements, and gray scale information of each intrablock picture element in a block is divided into three components:

(1) a reference level representing a position of a signal level of each intrablock picture element in a whole dynamic range of gray scale representation;

(2) a level difference representing a distribution range of signal levels of the intrablock picture elements; and (3) a level designating signal representing a level of each intrablock picture element within the distribution range, and these three components are independently coded.

Since the gray scale information is divided into three components for each block and the three components are independently coded, high-efficiency coding can be performed, and at the same time partial or general information of the original image can be easily extracted. Since complicated arithmetic processing is not required, high-speed operation can be achieved. Furthermore, parameters can be advantageously varied in accordance with level differences according to the visual sensitivity.

According to an aspect of the coding method of the present invention, blocks are classified into f block groups $B_1, B_2, \ldots B_f$ in an order of smaller level differences, the number of levels represented by level designating signals for the picture elements belonging to the block group $B_1$ having the smallest level difference is defined by $n_1$ gray scale levels and the number of levels represented by level designating signals for the picture elements belonging to the jth (j=1, 2, ... f) block group having the jth level difference is defined by $n_j$ gray scale levels on the basis of the numbers of levels of level designating signals $n_1, n_2, \ldots n_f$ satisfying relation $n_1 < n_2 < \ldots < n_f$. According to a preferred embodiment of the present invention, the coding scheme is classified into three coding modes according to level differences. More specifically, (1) for a block having a very large level difference, picture elements are quantized at four levels within the intrablock gray scale distribution range, (2) for a block having a relatively large level difference, picture elements are quantized at two levels within the intrablock gray scale distribution range, and (3) for a block having a very small level difference, picture elements are quantized at one level.

For an image whose continuous tone representation is not a primary importance, i.e., for a block belonging to a character area, at least one of the reference level and the level difference can be replaced with a constant or can be omitted, and the remaining parameters are used for coding. Furthermore, when the level designating signals are represented by bit plane coding, in an area whose continuous tone representation is not a primary importance, the number of bits on the bit plane can be set to be smaller than that of each block of the halftone picture, and the resultant image is coded.

A high-quality image of a character area can be obtained by the MSB (Most Significant Bit) of the binary number representing the level designating signal. If a character area in an image consisting of character and picture images is known in advance, the reference level, the level difference, the lower bits of the level designating signal for the blocks representing the character area can be omitted or replaced with corresponding constants. In this case, degration of the image does not greatly occur, and high-efficiency coding can be achieved A coding apparatus of the present invention comprises means for dividing an image into blocks each consisting of a plurality of picture elements, means for calculating and storing a maximum value of the signal level of each intrablock picture element in units of blocks, means for calculating and storing a minimum value of the signal level of each intrablock picture element in units of blocks, first coding means for setting a reference level in units of blocks on the basis of the signal level of each intrablock picture element and coding the reference level, second coding means for setting a level difference in units of blocks on the basis of the signal level of each intrablock picture element, and third coding means for setting quantization levels between the maximum and minimum values in each block, discriminating a corresponding one of the quantization levels for each intrablock picture element, and coding the level designating signal representing the discriminated quantization level.

A coding apparatus of the present invention is basically composed by a memory, a comparator, an arithmetic circuit, and a simple coding circuit. Therefore, the system configuration can be simplified.

According to one preferred embodiment of the present invention, the first coding means comprises arithmetic means for calculating a difference $\Delta L$ between a reference level $LA(j)$ of a jth block and a reference level $LA(j-1)$ of a $(j-1)$th block, and code generating means for variable-length coding the difference $\Delta L$.

According to one preferred embodiment of the present invention, the second coding means comprises arithmetic means for calculating a difference between the maximum value stored in maximum value storing means and the minimum value stored in the minimum value storing means, and code generating means for variable-length coding the difference between the maximum and minimum values.

According to one preferred embodiment of the present invention, the third coding means comprises means for setting the quantization levels at equal intervals between the maximum and minimum values on the basis of the maximum value stored in the maximum value storing means and the minimum value stored in the minimum value storing means.

According to another preferred embodiment of the present invention, the third coding means comprises threshold calculating means for selecting the quantization levels of each block on the basis of the signal level of the intrablock picture elements, means for storing the threshold value lq, comparing means for comparing each block image signal with the threshold value lq of the corresponding block, and means for discriminating which one of the f block groups $B_1, B_2, \ldots B_f$ ordered from smaller intrablock level differences corresponds to each block and for controlling to select a comparison output signal supplied from the comparing means to the coding circuit on the basis of a discrimination output so as to obtain level designating signals which represent the numbers of levels are given as $n_1, n_2, \ldots n_f$ assigned to the block groups $B_1, B_2, \ldots B_f$.

According to one preferred embodiment of the present invention, a decoding system for decoding a code coded by the coding method of the present invention comprises code control means for separating an input code string into a coded reference level, a coded level difference, and a coded level designating signal and outputting the coded reference level, the coded level difference, and the coded level designating signal, first decoding means for decoding the coded reference level, second decoding means for decoding the coded level difference, third decoding means for decoding the coded level designating signal, signal generating means for generating quantization levels on the basis of signals decoded by the first and second decoding means, and means for selecting one of quantization levels output from the signal generating means on the basis of the level designating signal decoded by the third decoding means.

The above and other objects, features, and advantages of the present invention will be apparent from the following detailed description in conjunction with the accompanying drawings.

BRIEF DESCRIPTION OF THE DRAWINGS

FIGS. 5(A) and 5(B) are charts for explaining code assignment for bit plane coding the level designating signals;

DETAILED DESCRIPTION OF THE PREFERRED EMBODIMENTS

Figure 1:
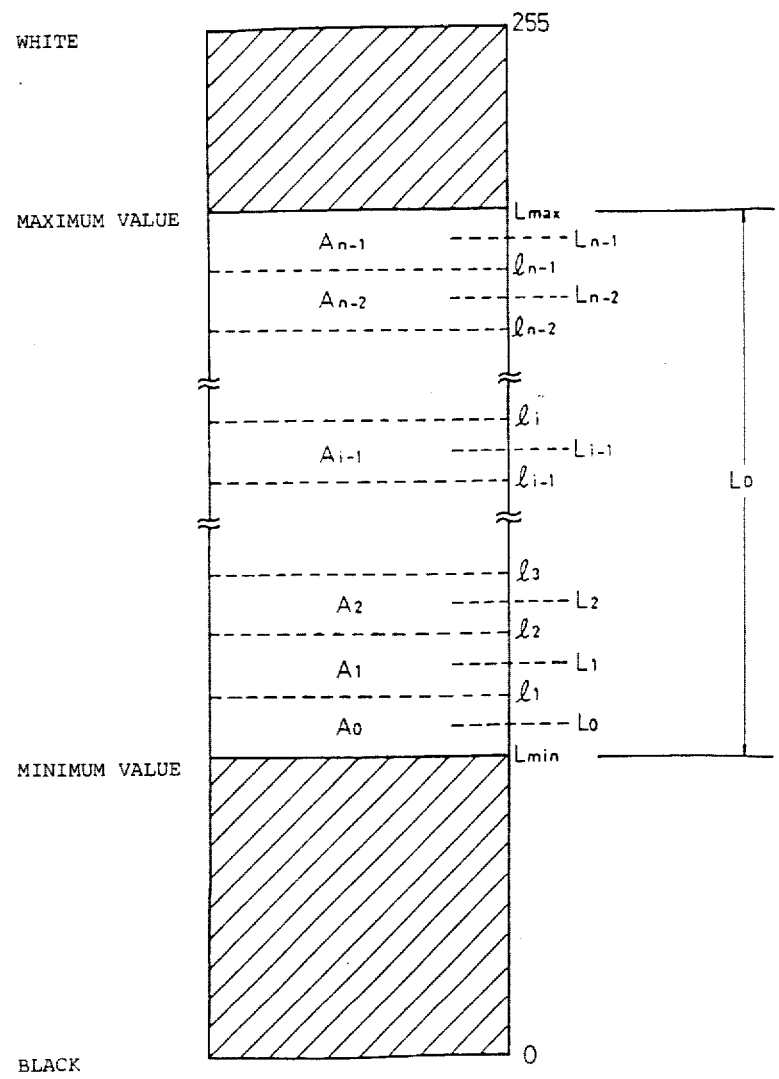
FIG. 1 is a chart for explaining the basic coding method according to the present invention.

FIG. 1 shows the principle of the present invention. A signal level of each picture element is represented by an 8-bit signal. A white picture element is given as a decimal 255 and a black picture element is given as a decimal 0. An image is divided into blocks each consisting of $m \times m$ picture elements. In a given block, a maximum value of the signal level of the picture elements is given as $L_{max}$, and a minimum value thereof is given as $L_{min}$.

The signal level $L_x$ of each intrablock picture element apparently falls within the range of $L_{min} \leq L_x \leq L_{max}$. The $L_x$ value is expressed as a relative value within the range of $L_{min}$ to $L_{max}$. FIG. 1 exemplifies the case wherein the position information of the signal level $L_x$ is expressed by n gray scale levels.

The range of $L_{min}$ to $L_{max}$ is equidistantly divided into level ranges $A_0, A_1, \ldots A_{n-1}$ by levels $l_1, l_2, l_3, \ldots l_n$. If a given signal level belongs to the level range $A_i$, the signal is represented by an average value $L_i$. In this case, the average value $L_i$ is defined as follows:

$$L_i = L_{min} + (1/n)(i + 1/2)L_D \tag{1}$$

where $L_D$ is the difference between the maximum and minimum values within the block, i.e., the intrablock level difference, which can be defined as:

$$L_D = L_{max} - L_{min}$$

Equation (1) signifies that the signal level $L_i$ of each picture element for a predetermined gray scale number n is represented by three values, i.e., the minimum value $L_{min}$ of the reference level, the level designating signal i, and the level difference $L_D$.

If relation $L_D = L_{max} - L_{min}$ is used, equation (1) can be rewritten into equation (2) or (3):

$$L_i = L_{max} - (1/n)(n - \frac{1}{2} - i)L_D \qquad (2)$$

$$L_i = L_M + (1/n)\{i - (n-1)/2\}L_D \qquad (3)$$

where $L_M$ is the average value between the values $L_{max}$ and $L_{min}$ and is represented by:

$$L_M = (L_{max} + L_{min})/2$$

Instead of using the value $L_{min}$, any value such as $L_{max}$, $L_M$ or a linear function of $L_{max}$ or $L_{min}$ may be used. Each value of $L_M$ or the like is given for each block, and it composes imaginary image having 1/m picture element density. In order to code such value $L_M$, $L_{max}$ or $L_{min}$, a conventional halftone image coding scheme can be utilized. For example, predictive coding may be performed such that a value of a given picture element is predicted by an adjacent picture element, and coding is performed on the basis of the predicted value. Alternatively, coding of a difference between the previous and current values may also be performed such that the signal level of the previous picture element on the scanning line and that of the current picture element is calculated, and the difference is coded.

If $n = 2^P$ is satisfied, the value of the level designating signal i is represented by P bits. In this case, each bit is coded by a black-and-white image coding. In other words, the bit plane coding scheme may be utilized. In this case, picture elements are replaced by blocks.

The level difference $L_D$ or the like is the dynamic range for representing the signal level in the block and is defined as:

$$L_D = L_{max} - L_{min}$$

Instead of coding the level difference itself, the level difference may be defined by a multiple by a constant, i.e., $\frac{1}{2}$ or $\frac{1}{4}$. The value of the level designating signal i may be coded by other coding schemes.

If the signal level $L_x$ falls within the following range:

$$L_{min} + (i/n)L_D \leq L_x < L_{min} + \{(i+1)/n\}L_D$$

The $L_x$ is in the range $A_i$, so that the quantized result of n gray scale levels is given as:

$$i \ (0 \leq i \leq n - 1)$$

The value i' represents a specific level in its dynamic range, which is between $L_{max}$ and $L_{min}$. In order to code the quantized level designating signal i, any conventional coding scheme can be applied as in the case for the minimum value $L_{min}$ (or $L_{max}$ or $L_M$). The level difference $L_D$ need not be defined as follows:

$$L_D = L_{max} - L_{min}$$

For example, as is apparent from equation (1), if the reference level is given as the minimum value $L_{min}$ and the level difference is defined as the maximum value $L_{max}$, the gray scale levels of the intrablock picture elements fall within the range between the maximum and minimum values $L_{max}$ and $L_{min}$. Therefore, the level difference may be selected as another predetermined level which can represent the level distribution range within the block unlike the case for the reference level $L_{min}$.

According to the main feature of the present invention, an image is divided into blocks each consisting of a plurality of picture elements, and gray scale information of each intrablock picture element is divided into (1) the reference level (e.g., $L_{max}$, $L_{min}$, and $L_M$) representing where a specific level in the signal level distribution range of the intrablock picture elements is within the whole dynamic range, (2) the level difference representing a distribution of the signal levels of the intrablock picture elements, and (3) the level designating signal i representing which level of the range designated by the level difference belongs to each intrablock picture element. The reference level, the level difference, and the level designating signal are independently coded. In order to decode the coded data, the coded reference level, the coded level difference, and the coded level designating signal are independently decoded to obtain decoded values, e.g., $L_{min}$ (or $L_{max}$ or $L_M$), $L_D$, and i, and equation (1), (2) or (3) is used to reproduce a value $L_i$ obtained by quantizing the signal level $L_x$ of the original image signal.

When these three components are independently coded, suitable known coding schemes can be used for each component.

Figure 2:
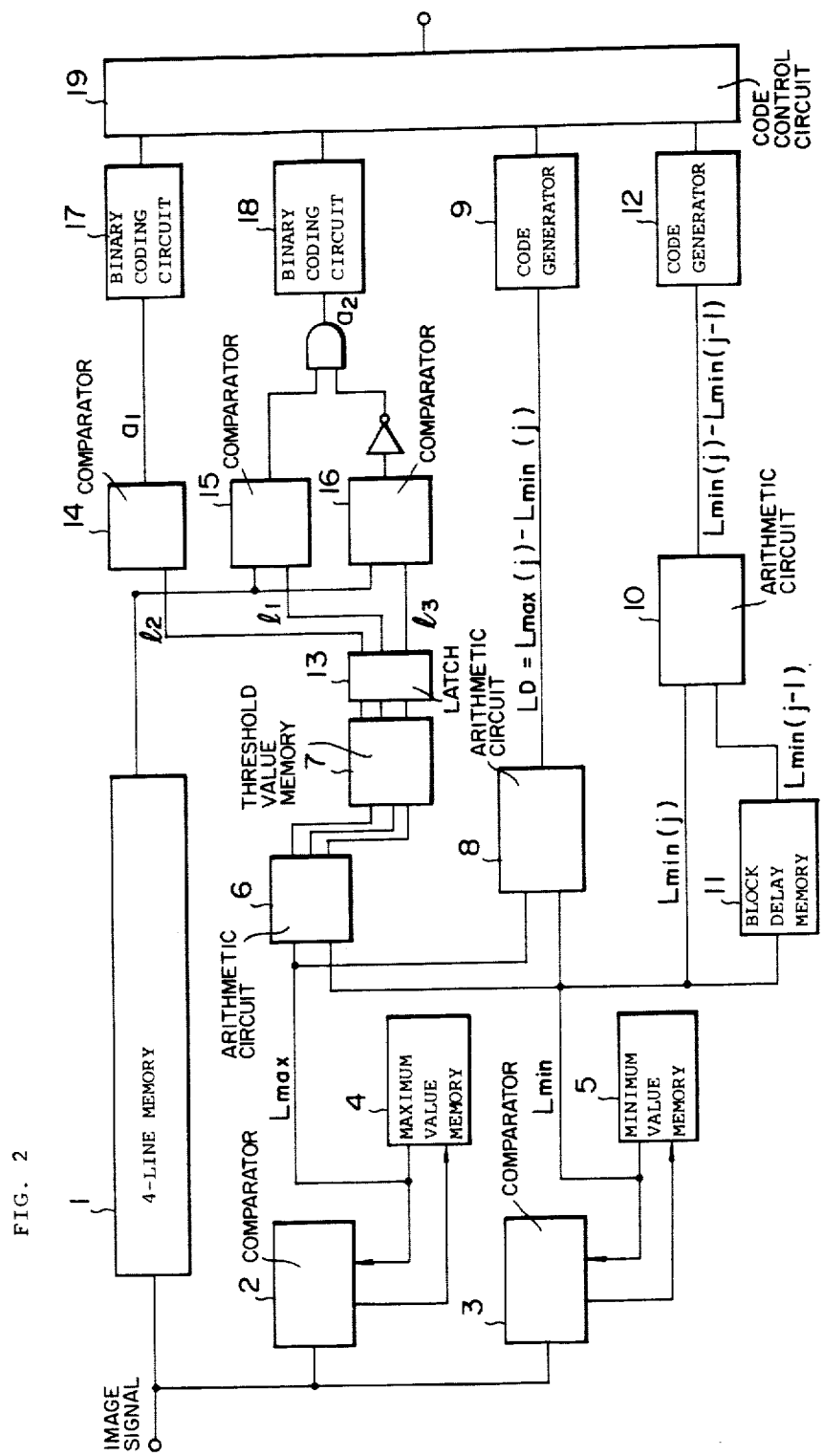
FIG. 2 is a block diagram of a coding apparatus according to an embodiment of the present invention.

FIG. 2 is a block diagram of a coding apparatus when the level designating signal i is expressed by using four levels.

Referring to FIG. 2, reference numeral 1 denotes a 4-line memory; 2 and 3, comparators, respectively; 4, a maximum value memory; 5, a minimum value memory; 6, 8 and 10, arithmetic circuits, respectively; 7, a threshold memory; 9 and 12, code generators, respectively; 11, a block delay memory; 13, a latch; 14 to 16, comparators, respectively; 17 and 18, binary coders, respectively; and 19, a code control circuit.

Figure 3:
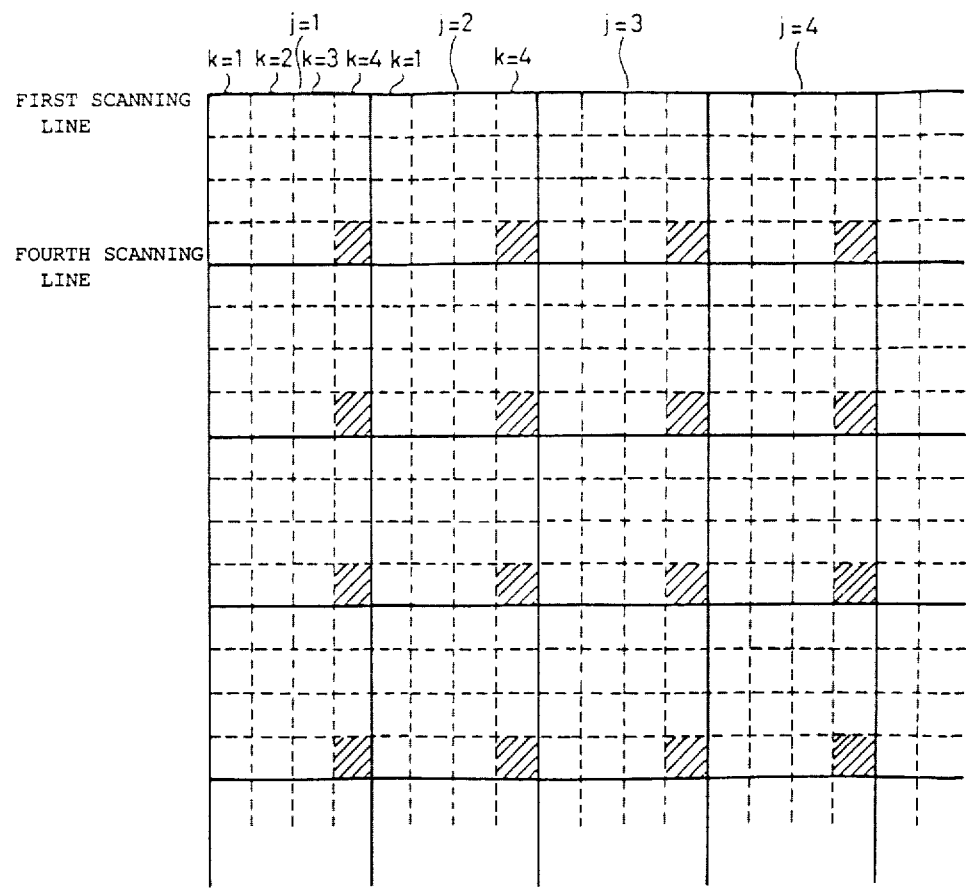
FIG. 3 is a chart for explaining the operation of the coding apparatus of FIG. 2.

FIG. 3 is a chart for explaining the operation of the apparatus in FIG. 2. Small squares defined by broken lines represent picture elements, respectively. Each large square defined by the solid lines represents a block consisting of 16 (4×4) picture elements.

Figure 4:
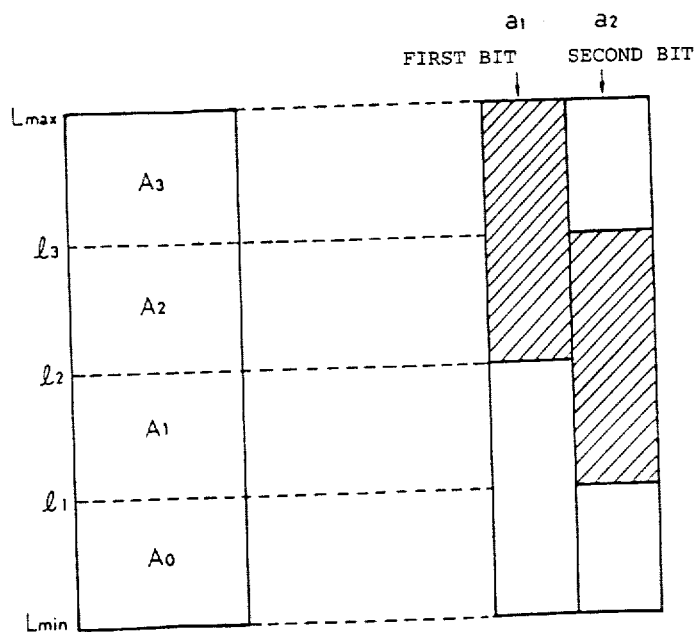
FIG. 4 is a chart for explaining the relationship between the quantization conditions of an original image signal and code assignment thereto.

FIG. 4 is a chart for explaining the quantization conditions of the original image signal and code assignment.

The operation of the apparatus in FIG. 2 will be described with reference to FIGS. 3 and 4.

In order to operate the apparatus of FIG. 2, image signals as the signal levels of the respective picture elements are sequentially input to the 4-line memory 1 and at the same time to the comparators 2 and 3. Four picture elements for each scanning line belong to the same block. The maximum value memory 4 can store maximum values the number of which is $\frac{1}{4}$ the number of picture elements on one scanning line.

When the $\{4(j-1)+k\}$th (j = 1, 2, 3, . . . ; and k = 1 to 4) picture element of a given scanning line is input to the comparator 2, it is compared with the value at the jth address of the maximum memory 4. If the image signal level is higher than the value at the jth address, the image signal level is stored as an updated memory value at the jth address in the maximum value memory 4.

In the sequential processing from the first scanning line to the fourth scanning line, when processing of the fourth picture element (indicated by the hatched line in FIG. 3) of the jth block of the fourth scanning line is completed, the maximum value $L_{max}(j)$ of the image signal level of the picture elements of the jth block is stored at the jth address of the maximum value memory 4.

Similarly, the minimum value $L_{min}(j)$ of the image signal level of the jth block is stored at the jth address of the minimum value memory 5.

When the maximum and minimum values $L_{max}$ and $L_{min}$ of each block are calculated, the arithmetic circuit 6 calculates threshold values $l_1$, $l_2$, and $l_3$ for determining which one of the level ranges $A_0$, $A_1$, $A_2$, and $A_3$ includes the signal level of the image signal. The calculated threshold values are stored in the threshold value memory 7:

$$l_q = L_{min} + (q/4)(L_{max} - L_{min})$$

for q = 1, 2, and 3

The arithmetic circuit 8 calculates a value $L_D (= L_{max} - L_{min})$, and the difference $L_D$ is supplied to the code generator 9. The code generator 9 generates a code corresponding to the input $L_D$. In order to achieve high efficiency, the code may have a fixed length but is set to assign a short code to a high occurrence rate of the value $L_D$. If the gray scale representation number N is 64, the value $L_D$ may be one of values 0 to 63. If the difference $L_D$ is near zero, an occurrence rate is very high. However, if the difference $L_D$ is increased, the occurrence rate is very small. For this reason, "1" is added to the end of a string of all "0"s the number of which is the number of differences $L_D$ to constitute data in the form of "000 . . . 001".

The arithmetic circuit 10 calculates a value $\Delta L$ (a difference between the previous and current values) representing a difference (i.e., $L_{min}(j) - L_{min}(j-1)$) between the reference level $L_{min}(j)$ of the jth block and the reference level $L_{min}(j-1)$ of the (j−1)th block. For this purpose, the value $L_{min}$ output from the minimum value memory 5 is delayed by one block by the block delay memory 11. Therefore, the values $L_{min}(j)$ and $L_{min}(j-1)$ are simultaneously supplied to the arithmetic circuit 10.

The value representing the difference between the current and previous values is input to the code geerator 12. The code generator 12 generates a code corresponding to the input difference. The difference may be a value falling within the range of −63 to +63 when the 64-gray scale representation is employed. However, an occurrence rate for a value near zero is high and is assigned to a short code. The code assignment is summarized in Table 1 below.

$L_{min}(0) = 0$ is set as an initial value for j = 1. For example, if $L_{min}(1)$, $L_{min}(2)$, $L_{min}(3)$, and $L_{min}(4)$ are respectively, 3, 5, 5, and 4, the values $\Delta L$ are respectively 3, 2, 0, and −1. When coding is performed according to table 1, a code string is given as:

"1101000011100101"

TABLE 1

| $\Delta L = L_{min}(j) - L_{min}(j-1)$ | Code |
|---|---|
| 0 | 0 |
| +1 | 100 |
| −1 | 101 |
| +2 | 1110 |
| −2 | 1111 |
| $\Delta L$ = +3 to +17 | 1101k($\Delta L$−3) where k(x) is the binary notation of x (4 bits) |
| $\Delta L$ = −3 to −17 | 1100k($|\Delta L|$−3) |

TABLE 1-continued

| $\Delta L = L_{min}(j) - L_{min}(j-1)$ | Code |
|---|---|
| $\Delta L$ = +18 to +63 | 1101111100 . . . 01 ($\Delta L$−18) |
| $\Delta L$ = −18 to −63 | 1100111100 . . . 01 ($|\Delta L|$−18) |

When all inputs of the four scanning lines are processed, the quantization threshold values $l_1$, $l_2$, and $l_3$ of all blocks are stored in the threshold value memory 7.

While the image signals of the fifth to eighth scanning lines are input, the image signals stored in the 4-line memory 1 are sequentially read out and compared with the threshold values $l_1$, $l_2$, and $l_3$ whether to correspond to the corresponding ones of the signal levels $A_0$ to $A_3$.

This operation will be described in detail below.

When the image signals belong to the jth block, among the image signals of the first to fourth scanning lines, are read out, the threshold values $l_1$, $l_2$, and $l_3$ of the jth block are read out from the threshold value memory 7 and are latched by the latch 13. Each image signal is compared with the threshold values $l_2$, $l_1$, and $l_3$ by the comparators 14, 15, and 16. If the signal level of the image signal is larger than the respective threshold values, the comparators 14, 15, and 16 go high.

The quantization level of each image signal is determined by the resultant upper and lower bits $a_1$ and $a_2$. The relationship between the image signal levels $A_0$ to $A_3$ and the upper and lower bits $a_1$ and $a_2$ is shown in FIG. 4.

In the right side of FIG. 4, the hatched portions represent high level (1), and white portions represent low level (0). If the image signal level $L_x$ satisfies $l_2 \leq L_i$, then the upper bit $a_1$ is set at high level. If the level $L_x$ satisfies $l_1 \leq L_i < l_3$, the lower bit $a_2$ is set at high level. The signals $a_1$ and $a_2$ are respectively input to the binary coding circuits 17 and 18. The white area is coded to logic "1", and the black area is coded to logic "0" according to a black-and-white binary image coding scheme such as modified Huffman (MH) or modified Read (MR) coding scheme.

The coding circuits 17 and 18 are arranged according to a pipeline system so as to code the image signals of one scanning line within the one-line scanning period.

If the image signal stored in the 4-line memory 1 is to be controlled, e.g., the rth image signal of the Kth scanning line is input, the prestored r'th image signal of the (K-4)th scanning line is read out and then the rth image of the Kth scanning line is input. The same operation is applied to the threshold value memory 7. During processing of the image signal of the 4Kth scanning line, the timings for storing the threshold values $l_1$, $l_2$, and $l_3$ of the ith block output from the arithmetic circuit 6 are given as timings for storing new values after the previous values $l_1$, $l_2$, and $l_3$ stored at the time of scanning of the {4(K−1)}th scanning line are latched by the latch 13 and the previously stored values become insignfficant. If the latch 13 is not arranged, the above timings are the ones when the comparator operations are completed.

The operations of the code generators 9 and 12 are performed in a real time manner during which the image signal of the 4Kth scanning line is processed. However, in the same manner as in the threshold values $l_1$, $l_2$, and $l_3$, the operations of the code generators 9 and 12 may be performed during which the image signals of the (4K+1)th to 5Kth scanning lines are processed upon temporal storage of the signal of the 4Kth scanning line.

In this manner, the level difference $L_D$, the difference $\Delta L$ between the previous and current reference levels, and the level designating levels $a_1$ and $a_2$ are coded, and the coded data is transmitted through a transmission line or stored in an image memory. In this case, various decoding schemes may be proposed. For example, there is a method wherein the codes are decoded in an order of $L_D$, $L_{min}$, $a_1$, and $a_2$ of one frame, and the coded signals are decoded after they are temporarily stored in a memory. There is another decoding method wherein the signals are arranged in an order of blocks. For example, according to the method for arranging the signals in an order of blocks, differences $L_D$ and differences $\Delta L$ of the first block array are arranged as follows:

$L_D(1)$, $\Delta L(0,1)$, $L_D(2)$, $\Delta L(1,2)$, $L_D(3)$, $\Delta L(2,3)$, ...
$L_D(i)$, $\Delta L(i-1,i)$, ... (for $\Delta L(i-1,i)=L_{min}(i)-L_{min}(i-1)$)

Thereafter, the array can be obtained as follows:
- $a_1$ for the first scanning line
- $a_2$ for the first scanning line
- $a_1$ for the second scanning line
- $a_2$ for the second scanning line
- $a_1$ for the fourth scanning line
- $a_2$ for the fourth scanning line This code rearrangement is performed by the code control circuit 19.

In the decoding mode, the level difference $L_D$ and the difference $\Delta L$ between the previous and current reference levels are decoded to calculate the minimum and maximum values $L_{min}$ and $L_{max}$ of the image signal levels, the quantization levels $L_1$, $L_2$, $L_3$, and $L_4$. The correspondence between the quantization levels $L_1$ to $L_4$ and the quantization levels of the picture elements is determined on the basis of level designating signals $a_1$ and $a_2$. The boundary from the codes $L_D$ and $\Delta L$ in the code string to the code $a_1$ is easily discriminated by counting the number of reception blocks. The boundary from the code $a_1$ to $a_2$ can also be easily discriminated by counting the number of decoded picture elements. In order to simplify the arrangement of the decoding circuit, a special sync code may be inserted in the code string.

In the decoding mode, $L_D$ and $\Delta L$ are decoded, and then $L_{min}$ is decoded on the basis of the decoded $\Delta L$. Therefore, the level difference $L_D$ and the minimum value $L_{min}$ of each block can be calculated.

Subsequently, the signals $a_1$ and $a_2$ are decoded, and the signal levels of the original image signals are decoded on the basis of the values of the signals $a_1$ and $a_2$, as shown in Table 2 below:

TABLE 2

| $a_1$ | $a_2$ | Decoded Signal |
|---|---|---|
| 0 | 0 | $L_{min} + L_D/8$ |
| 0 | 1 | $L_{min} + 3L_D/8$ |
| 1 | 1 | $L_{min} + 5L_D/8$ |
| 1 | 0 | $L_{min} + 7L_D/8$ |

In the above embodiment, the level designating signal n is expressed by four gray scale levels by using two bits, i.e., bit signals $a_1$ and $a_2$. However, the number of gray scale levels is not limited to four. For example, if n=64, six bits, i.e., $a_1$, $a_2$, ... $a_6$ must be used. In this case, if bit plane coding is to be performed, the relationship between the level designating signals and the contents of the bit string "$a_1 a_2 ... a_6$" is given as shown in FIG. 5(B). A black area represents high level and a white area represents low level in FIGS. 5(A) and 5(B). FIG. 5(B) shows gray codes whose black and white levels are less frequently changed as compared with the binary codes in FIG. 5(A). Therefore, the average number of coding data can be reduced when an original image is coded by MR coding.

Figure 6:
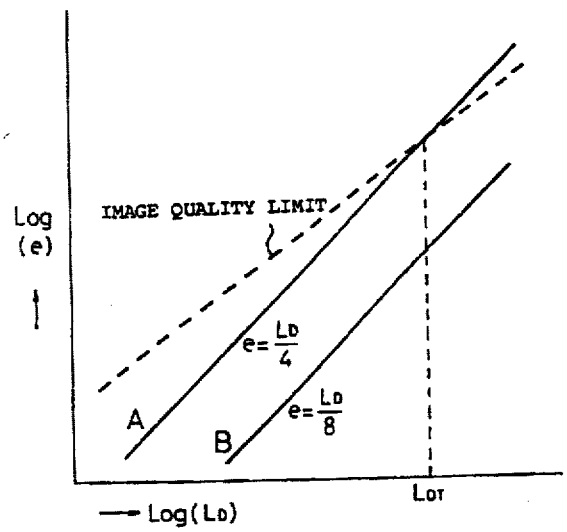
FIG. 6 is a graph showing the relationship between the level difference, the quantization error of the level designating signal, and image quality limitations.

The conditions for setting level designating signals will be described below. The broken line in FIG. 6 represents experimental results of the relationship between the level difference $L_D$, the image quality for obtaining a desired image quality, and the limit of the signal level error e. The error e is a difference between the signal level $L_x$ of the original image signal and the signal level $L_R$ of the decoded image signal, that is, $$e = |L_R - L_x|$$

The graph in FIG. 6 signifies that when the level difference $L_D$ is large, the error limit is increased. More specifically, when $L_D$ is small, the quantization error must be small. However, if $L_D$ is large, the quantization error may be relatively large.

The solid lines A and B represent maximum values of the quantization errors when the level designating signal represents two and four gray scale levels.

In the case of four gray scale levels, the signal level error e represents a level below the limit value for all differences $L_D$. In this sense, considerably high image quality can be obtained when four gray scale levels are used.

However, in the case of two gray scale levels, at $L_D = L_{DT}$, the solid line A crosses the broken line. The blocks given by $L_D > L_{DT}$ do not satisfy the conditions for the prescribed image quality. In order to obtain the desired image quality, two gray scale levels are sufficient for the blocks satisfying $L_D \leq L_{DT}$. However, three or more gray scale levels are required for the blocks satisfying $L_D > L_{DT}$. In general, when the level difference $L_D$ is increased, level designating signal represents a larger number of gray scale levels.

In order to perform effective coding, the following measure is required. The blocks are classified into (f+1) block groups according to the values of the difference $L_D$:

If $L_D < L_{D1}$, then the number of gray scale levels: $n_0 \geq 1$

If $L_{D1} \leq L_D < L_{D2}$, then the number of gray scale levels: $n_1 > n_0$ If $L_{D(f-1)} \leq L_D < L_{Df}$, then the number of gray scale levels: $n_{f-1} > n_{f-2}$ If $L_{Df} \leq L_D$, then the number of gray scale levels: $n_f > n_{f-1}$ In general, the number of gray scale levels must be set to satisfy $n_f > n_{f-1}$. Therefore, the number of level designating signals can be minimized to achieve coding with high efficiency.

Figure 7:
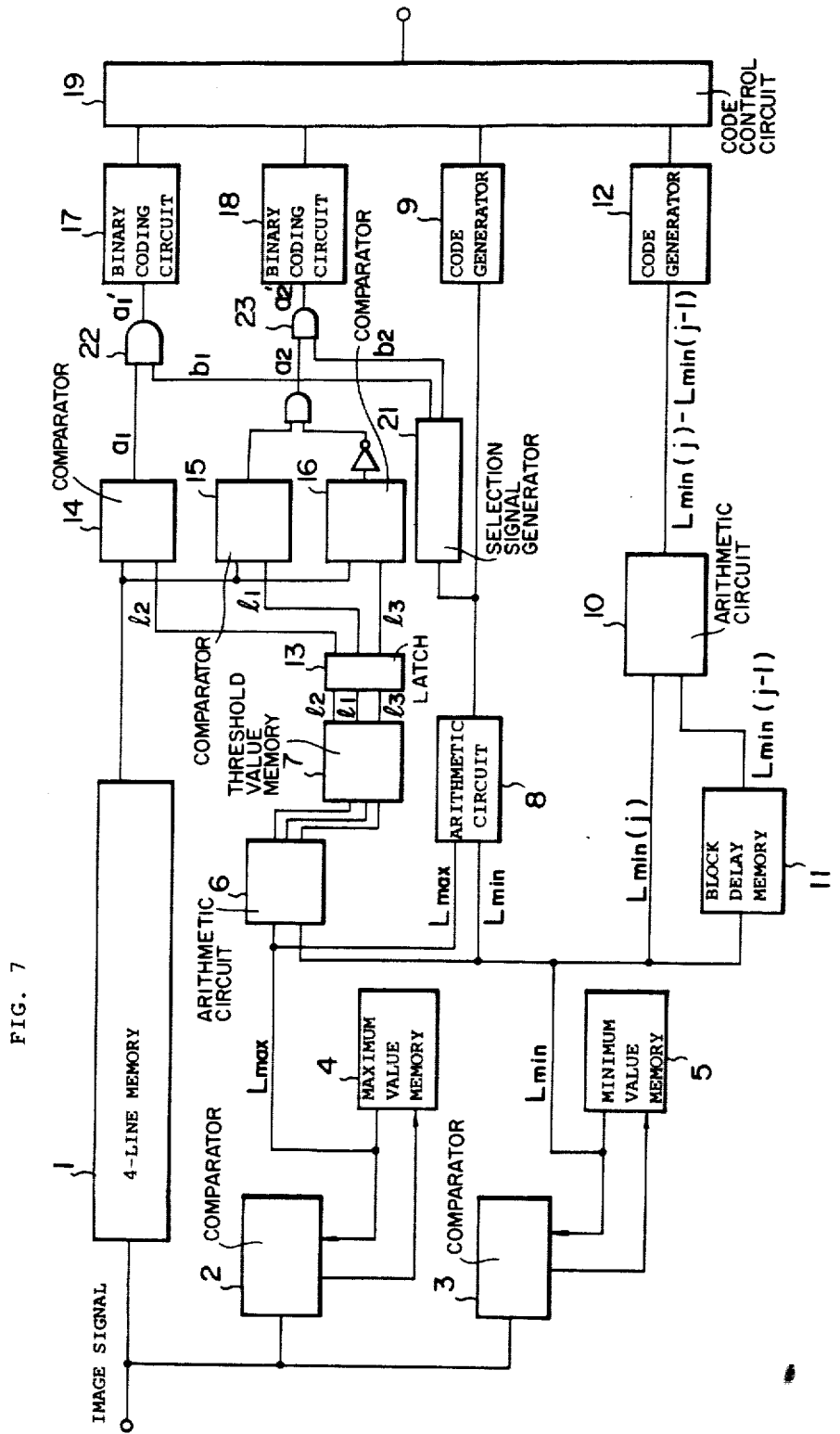
FIGS. 7, 9, and 10 are respectively block diagrams of coding apparatuses according to other embodiments of the present invention.

FIG. 7 is a circuit arrangement for selecting 3 level designating signal levels, i.e., 1, 2, and 4 on the basis of the values of the level difference $L_D$. The same reference numerals as in FIG. 2 denote the same parts in FIG. 7. Reference numeral 21 denotes a selection signal generator; and 22 and 23, gate circuits, respectively. The gray scale levels are 64 levels. The white picture element is presented by a decimal 63, the black picture element is represented by a decimal 0, and the intermediate levels are represented by integers falling within the range of 1 to 62. Therefore, the range for the values $L_D$, $L_{max}$, $L_{min}$, and $L_M$ is 0 to 63. Referring to FIG. 7, the means for calculating the maximum value $L_{max}$, the minimum value $L_{min}$, the threshold values $l_1$, $l_2$, and $l_3$, and the level difference $L_D$ are the same as those in the embodiment of FIG. 2.

The selection signal generator 21 compares difference values $L_D$ with the reference value and controls to obtain the following results:

if $L_D \leq 3$, then the level designating signal represents one gray scale level;

if $3 < L_D \leq 32$, then the level designating signal represents two gray scale levels; and if $32 < L_D \leq 63$, then the level designating signal represents four gray scale levels.

For this reason, if $32 \leq L_D \leq 63$, both the output gate signals $b_1$ and $b_2$ are set at high level. The outputs from the gate circuits 22 and 23 are gated without modifications, so that the signals input to the binary coding circuits 17 and 18 are the same as in FIG. 2.

If $L_D \leq 3$, both the gate signals $b_1$ and $b_2$ are set at low level. The outputs from the gate circuits 22 and 23 are set at low level regardless of the logic levels of the signals $a_1$ and $a_2$.

If $3 < L_D \leq 32$, the gate signal $b_1$ is set at high level and the gate signal $b_2$ is set at low level. An output $a_1'$ from the gate circuit 22 is the same as the input signal $a_1$. However, an output $a_2'$ from the gate circuit 23 is always set at low level regardless of the logic level of the input $a_2$, thereby representing two gray scale levels.

In the decoding mode, the level difference $L_D$ is calculated. If $L_D \leq 3$, then the level designating signal represents only one gray scale level and is given for all picture elements within each block:

$$L_i = L_{min} + L_D/2$$

If $3 < L_D \leq 32$, two gray scale levels are used. If $a_1'$ is set at high level according to the decoded value thereof, then decoding is performed such that $$L_i = L_{min} + 3L_D/4$$

If $a_1'$ is set at low level, decoding is performed such that $$L_i = L_{min} + L_D/4$$

If 32 $L_D$, four gray scale levels are used. The level designating signals of the picture elements are decoded on the basis of the signals $a_1'$ and $a_2'$ in the same manner as in FIG. 2. Values 3 and 32 as the reference values for setting the gray scale levels must be commonly used in both coding and decoding.

In the above description, the quantization method for obtaining the level designating signal is to equidistantly divide the interval between the maximum and minimum values $L_{max}$ and $L_{min}$. This quantization method is required to decode the coded level designating signal when the level designating signal represents four or more gray scale levels. However, such a quantization method is not required to use two-gray scale level representation. Therefore, the blocks represented by one or two gray scale levels may have non-linear quantization levels to be described below.

Figure 8:
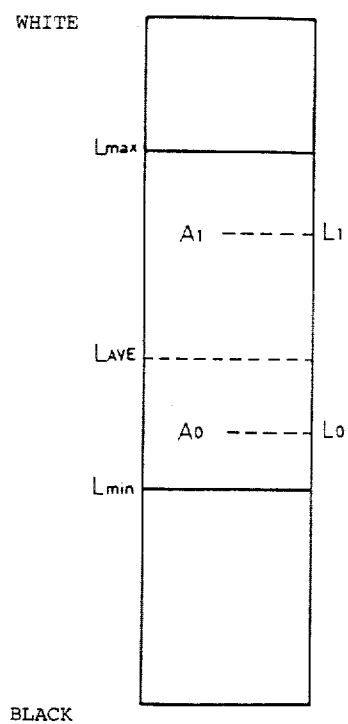
FIG. 8 is a chart for explaining non-linear two-level quantization of the level designating signals.

In gray scale representation using only one level, it is the best way to calculate an average level $L_{AVE}$ of the picture elements within each block so as to minimize the quantization errors of the signal levels of the picture elements within the block. In the case of gray scale representation using two levels, in order to minimize the quantization error of the signal levels within the block, as shown in FIG. 8, the intrablock picture elements are classified into a set $A_1$ having larger signal levels than the average signal $L_{AVE}$ and a set $A_0$ having smaller signal levels than the average signal $L_{AVE}$. Average level signals of the sets $A_0$ and $A_1$ are respectively defined as $L_1$ and $L_0$, and a new average $L_{AVE}'$ is calculated by $(L_0 + L_1)/2$. The sets $A_1$ and $A_0$ are classified again according to the new average $L_{AVE}'$ to update $L_1$ and $L_0$. The above operation is repeated several times, and the resultant $L_1$ and $L_0$ are quantized. According to this method, however, a large number of data must be used. In order to prevent this, an approximation can be performed in the following manner.

When two gray scale levels are used, the degradation of image quality occurs in a block having a large level difference $L_D$. An average level $L_{AVE}$ of the intrablock picture elements in the blocks having larger level differences $L_D$ is calculated. The picture elements are classified into a picture element set $A_1$ having larger signal levels than the average level $L_{AVE}$ and a picture element set $A_0$ having smaller signal levels than the average level $L_{AVE}$. For the picture element belonging to the set $A_1$, a quantization value is calculated by $L_1 = (L_{AVE} + L_{max})/2$. For the picture element belonging to the set $A_0$, a quantization value is calculated by $L_0 = (L_{AVE} + L_{min})/2$. The quantization values may be simply replaced with $L_0 = L_{min} + 3L_D/4$ and $L_1 = L_{min} + L_D/4$. In order to also simplify the arithmetic operations, $(L_{max} + L_{min})/2$ may be used in place of $L_{AVE}$. In this manner, representation of two gray scale levels is used for non-linear representation, a difference $L_D' = L_1 - L_0$ (or a value proportional thereto) of the quantized values of the level signals is preferably used in place of the level difference $L_D$.

Figure 9:
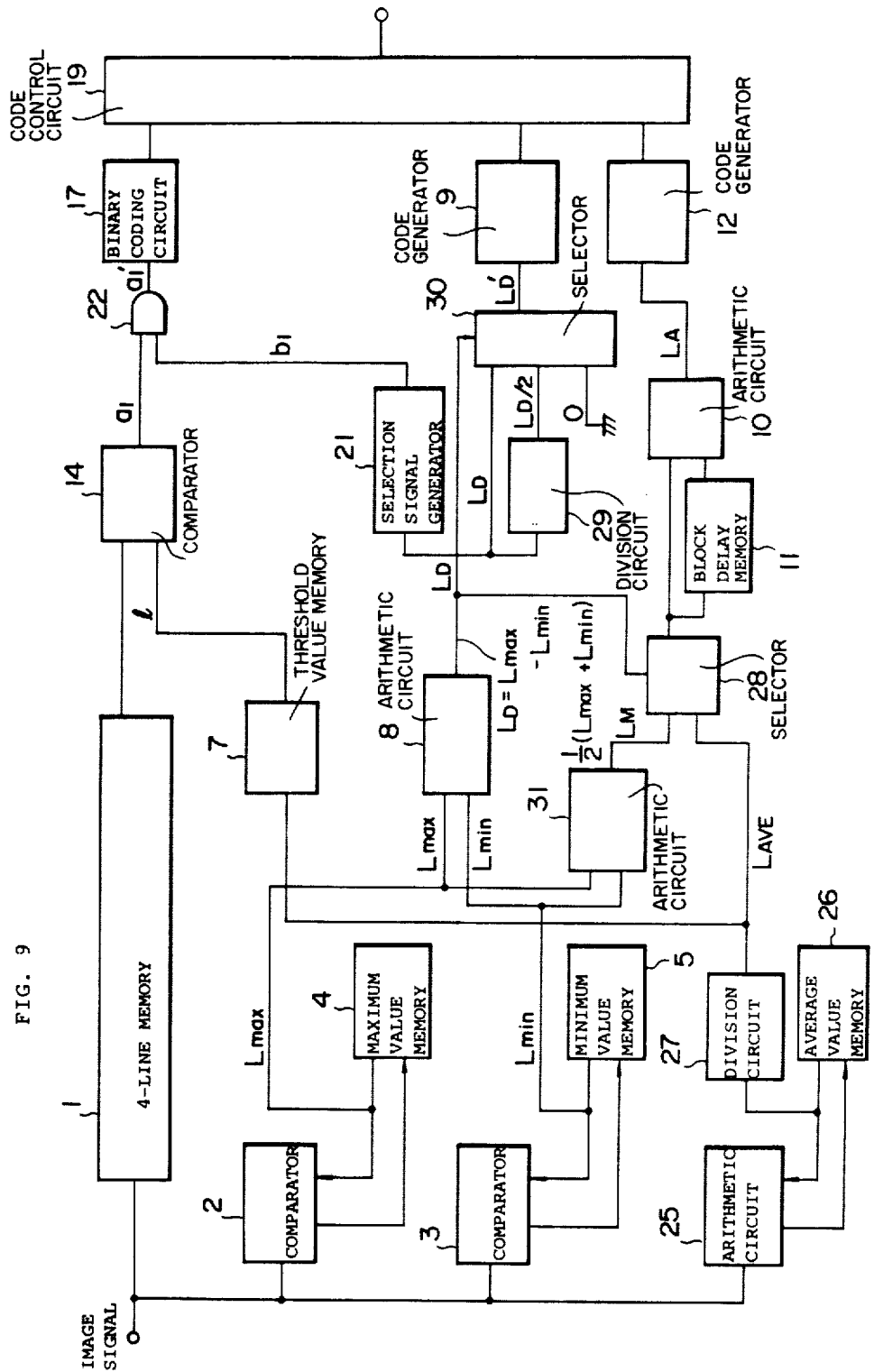

Another embodiment will be described with reference to FIG. 9 wherein approximation is performed by using one or two gray scale levels. The same reference numerals as in FIGS. 2 and 7 denote the same parts in FIG. 9. Reference numerals 25 and 31 denote arithmetic circuits, respectively; 26, an average value memory; 27 and 29, division circuits, respectively; and 28 and 30, selectors, respectively. All gray scale levels number 64 (=N). Referring to FIG. 9, the means for calculating the maximum and minimum values $L_{max}$ and $L_{min}$ and the level difference $L_D$ of the signal levels are the same as those in FIGS. 2 and 7. The arithmetic circuit 25 and the average value memory 26 calculate the average values of the signal levels of each block. These circuits serve as a comparator and a memory so as to calculate the maximum and minimum values $L_{max}$ and $L_{min}$ of each block. More specifically, the average value memory 26 stores average values the number of which is ¼ the number of picture elements on one scanning line. When the image signal of the $\{4(j-1)\,k\}$th $(j=1, 2, 3, \ldots;$ and $k=1$ to 4) is supplied to the arithmetic circuit 25, the value at the jth address of the average value memory 26 and the image signal are added, and the resultant sum is stored at the jth address of the average value memory 26.

When the fourth picture element (indicated by the hatched portion in FIG. 3) of the jth block of the fourth scanning line is completely processed during processing of first to fourth scanning lines, a value 16 times the average value of the signal levels of the jth block is stored at the jth address of the average value memory 26. The stored value is supplied to a threshold value memory 7 through the division circuit 27 and stored at the jth address of the threshold value memory 7.

When all inputs of the fourth scanning line are processed, the average values of all blocks are stored in the threshold value memory 7.

When the image signals of the fifth to eighth scanning lines are input, the signals of the 4-line memory 1 are sequentially processed and output. When the image signal of the jth block is output, a threshold value 1 stored at the jth address of the threshold value memory 7 is read out and the readout value is supplied to a comparator 14. The comparator 14 compares the level of the image signal with the value 1. If the level of the image signal is larger than the value 1, the output $a_1$ from the comparator 14 is set at high level; otherwise, the output $a_1$ is set at low level in the same manner as in FIGS. 2 and 7. The selector 28 selects one of the average signal $L_{AVE}$ and the average value $L_M$ between the maximum and minimum values $L_{max}$ and $L_{min}$ output from the arithmetic circuit 31 on the basis of the value of the level difference $L_D$. More specifically, if $L_D \leq 3$, the average level $L_{AVE}$ represents only one gray level. If two gray scale levels are used, $(L_{max}+L_{min})/2$ is set as the central value of the two quantization levels. The operations of the block delay memory 11, the arithmetic circuit 10, and the code generator 12 are the same as those in FIGS. 2 and 7.

The division circuit 29 divides the value of the level difference $L_D$ into ½ and outputs a ½ output. The selector 30 selects as the level difference $L_D'$ one of the $L_D$, $L_D/2$, and 0 in the following manner:

If $L_D \leq 3$, then $L_D' = 0$

If $3 < L_D \leq 128$, then $L_D' = L_D/2$ if $128 < L_D$, then $L_D' = L_D$

The operation of the coding generating 9 for coding the difference $L_D'$ is the same as that in FIG. 2.

Although the operation of the selection signal generator 21 is the same as that of FIG. 7, the case in FIG. 9 does not include representation of four gray scale levels. Therefore, the selection signal generator 21 controls only one bit. More specifically, if $L_D \leq 3$, then the output gate signal $b_1$ is set at low level, i.e., logic "0", an output $a_1'$ from the gate circuit 22 is always set at low level. If $3 < L_D$, then the output gate signal $b_1$ is set at high level, i.e., logic "1", so that an output $a_1'$ from the gate circuit 22 is kept unchanged as $a_1$. The operation of the binary coding circuit 17 is the same as that in FIGS. 2 and 7.

In the decoding mode, the reference level $L_A$, the level difference $L_D'$, and the one-bit signal $a_1'$ representing the level designating signal are decoded, and the original signal level $L_X$ is then reproduced as follows:

$L_X = L_A + (L_D'/2)$ (for $a_1' = $ "1")

$L_X = L_A - (L_D'/2)$ (for $a_1' = $ "0")

wherein if $L_X >$ white level, then a correction is performed such that $L_X = $ white level; and if $L_X <$ black level, then a correction is performed such that $L_X = $ black level).

Figure 10:
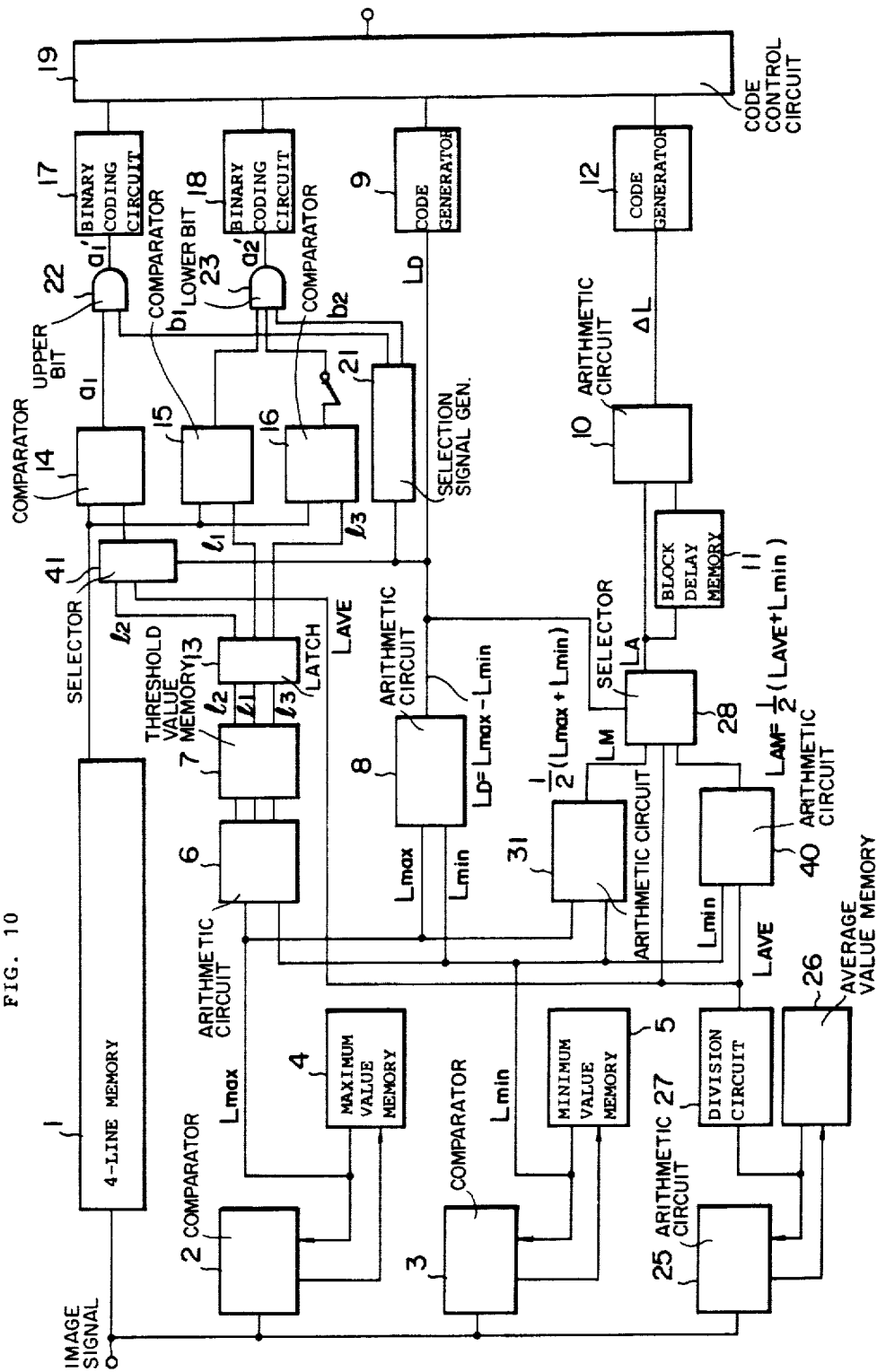

FIG. 10 shows still another embodiment of the present invention when the gray scale levels number 64. The same reference numerals as in FIGS. 2, 7, and 9 denote the same parts in FIG. 10. Referring to FIG. 10, reference numeral 40 denotes an arithmetic circuit; and 41, a selector. In the case of FIG. 10, if $L_D \leq 3$, only the average value $L_{AVE}$ is used to achieve gray scale representation using only one level. If $3 < L_D \leq 32$, then two levels are used with respect to the level $L_{AVE}$, that is, $(L_{AVE}+L_{max})/2$ and $(L_{AVE}+L_{min})/2$. However, if $32 \leq L_D$, then four levels are used such that $L_{min} + (\frac{1}{4})(i+\frac{1}{2})L_D$ ($i = 0, 1, 2,$ and 3).

The arithmetic circuit 40 calculates an average value $L_{AM}$ between the average value $L_{AVE}$ and the minimum value $L_{min}$ of the signal level of each picture element in each block. If two gray scale levels are to be used, i.e., if $3 < L_D \leq 32$, the selector 28 selects $L_{AM}$ as the reference level $L_A$. However, if four gray scale levels are used, i.e., if $32 \leq L_D$, the selector 28 selects as $L_A$ the average value $L_M$ between the maximum and minimum values $L_{max}$ and $L_{min}$. If one gray scale level is used, i.e., if $L_D \leq 3$, the selector 28 selects the average value $L_{AVE}$.

If two gray scale levels are to be used, the selector 41 selects the value $L_{AVE}$ as a threshold value for designating the level designating signal. In the decoding mode, if $L_D \leq 3$, then the signal level of each picture element is decoded such that $L_X = L_A$. If $3 < L_D \leq 32$ and $a' = 1$, then the signal level is decoded such that $L_X = L_A + L_D/2$. If $3 < L_D \leq 32$ and $a' = 0$, then the signal level is decoded such that $L_X = L_A$. If $32 < L_D$, then the signal level is decoded according to Table 3 below.

TABLE 3

| $a_1$ | $a_2$ | Decoded Signal |
|---|---|---|
| 0 | 0 | $L_A - 3L_D/8$ |
| 0 | 1 | $L_A - L_D/8$ |
| 1 | 1 | $L_A + L_D/8$ |
| 1 | 0 | $L_A + 3L_D/8$ |

Figure 11:
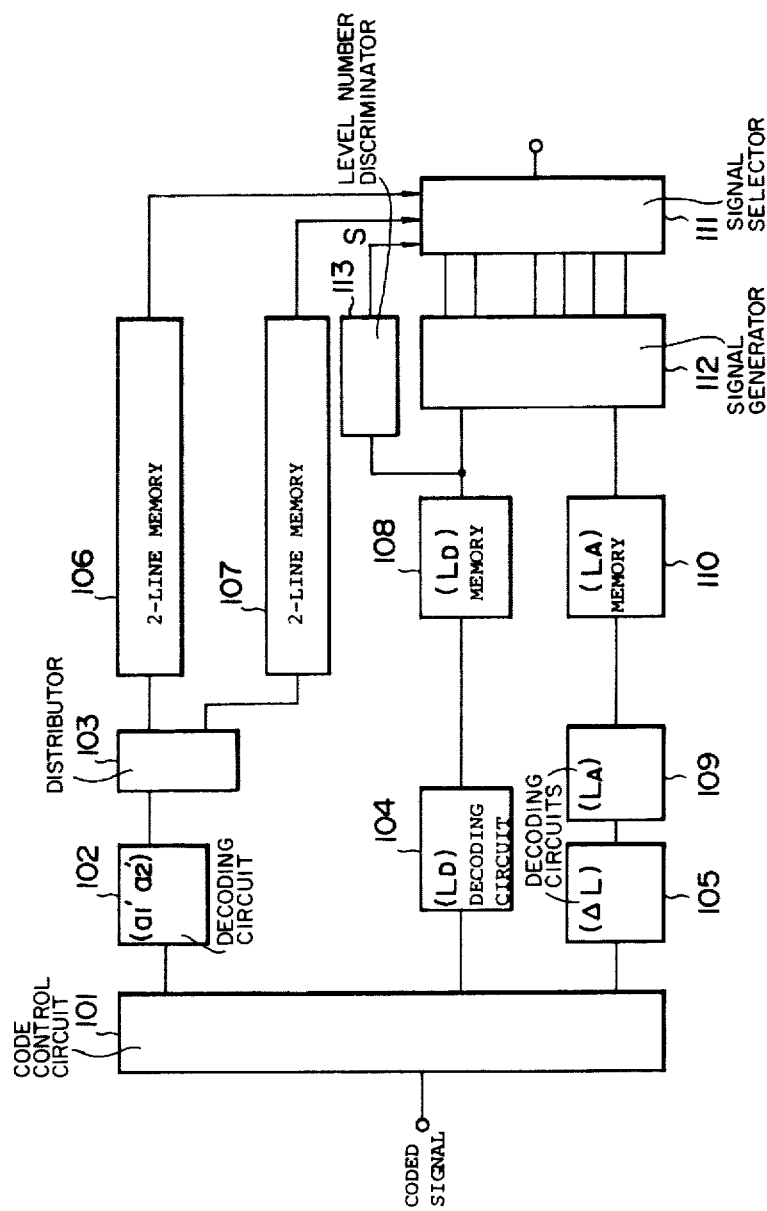
FIG. 11 is a block diagram of a decoding circuit according to the present invention.

A decoding apparatus for decoding the signals coded by the embodiment of FIG. 10 is shown in FIG. 11. Referring to FIG. 11, reference numeral 101 denotes a code control circuit; 102, 104, 105, and 109, decoders, respectively; 103, a distributor; 106 and 107, 2-line memories, respectively; 108 and 110, memories, respectively; 111, a signal selection circuit; 112, a signal generator; and 113, a level discriminator.

The code control circuit 101 distributes the signals to the decoders 102, 104, and 105. The coded signal has an array of $L_D$, $\Delta L$ and ($a_1'$ and $a_2'$) in units of four scanning lines. The level difference $L_D$ is decoded by the decoder 104, and the decoded differences are sequentially stored in the memory 108. Subsequently, the difference $\Delta L$ of the previous and current reference levels $L_A$ is decoded by the decoder 105. The reference level $L_A$ of each block is decoded by the decoder 109 on the basis of the decoded L. The decoded reference levels $L_A$ are sequentially stored in the memory 110. The coded level designating signals $a_1'$ and $a_2'$ are alternately supplied in units of scanning lines and sequentially stored in the 2-line memories 106 and 107. When the signals $a_1'$ and $a_2'$ of first scanning line are decoded, the signals of the second scanning line are decoded and the decoded results are stored in the 2-line memories 106 and 107. Meanwhile, the decoded signals of the first scanning line are supplied as selection signals to the signal selection circuit 111. The signal generator 112 calculates two signals $L_A$ and $L_A + L_D/2$ for two gray scale levels and four signals for four gray scale levels shown in Table 3 in synchronism with the picture element positions represented by the level designating signals $a_1'$ and $a_2'$ output from the 2-line memories 106 and 107 on the basis of the contents of the memories 108 and 110. A total of six signals are supplied to the signal selector 111. At the same time, the level number discriminator 113 generates a level number discrimination signal S for discriminating the number of levels to be 1 (or 2) or 4. The signal S is supplied to the signal selector 111. For example, if $L_D \leq 32$, then S=0. If $32 < L_D$, then S=1.

If S=1, then the signal selector 111 selects one of the six signals according to Table 3. If S=0 and $a_1' = 1$, then the signal selector 111 selects $L_A + L_D/2$. If S=0 and $a_1' = 0$, the signals selector 111 selects $L_A$. Whenever the level designating signals $a_1'$ and $a_2'$ of the second to fourth scanning lines are decoded, the above operation is repeated, thereby reproducing the original image of four scanning lines. Whenever decoding is completed, information of new scanning lines is stored in the 2-line memories 106 and 107. Subsequently, when the decoded $L_D$ and the decoded $\Delta L$ are input, decoding for the fifth and sixth scanning lines is performed. In this case, if the signals of the fourth scanning line are not completely decoded upon reception of the coded signals $L_D$ and $\Delta L$, the input signals are temporarily stored in the code control circuit 101, and decoding of the fourth scanning line is awaited.

Figure 12:
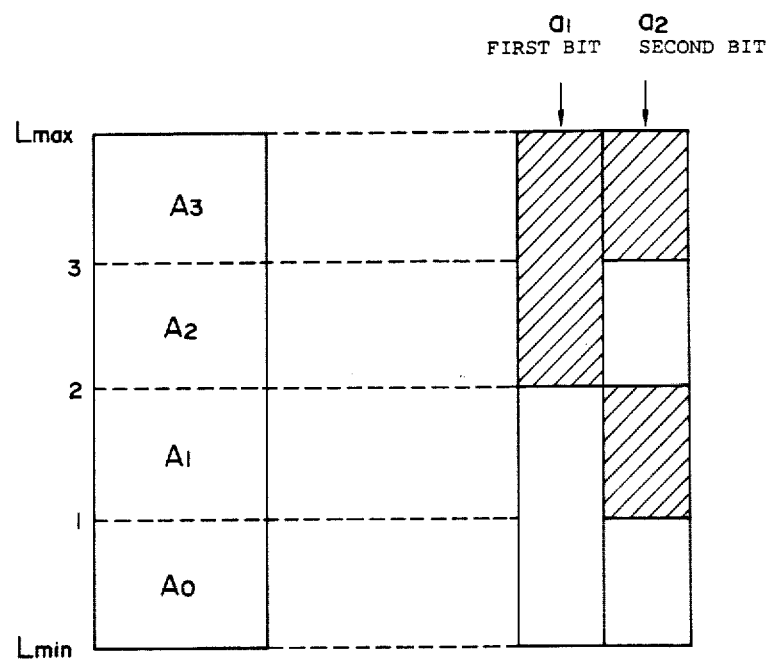
FIG. 12 is a chart for explaining another relationship between the quantization conditions of the original image signal and the code assignment.

In the above description, the values $a_1$ and $a_2$ of the level designating sinal are defined in FIG. 4. However, the levels may be assigned as shown in FIG. 12. The first bit $a_1$ is the same as that in FIG. 4. However, the second bit $a_2$ is set at high level (i.e., logic "1") when the $L_x$ satisfies as $l_3 \leq L_x$ or $l_1 \leq L_x < l_2$. In this case, if the reference level is defined as $L_A$, the decoding conditions can be summarized in Table 4 in place of Table 3.

TABLE 4

| $a_1$ | $a_2$ | Decoded Signal |
|---|---|---|
| 0 | 0 | $L_A - 3L_D/8$ |
| 0 | 1 | $L_A - L_D/8$ |
| 1 | 0 | $L_A + L_D/8$ |
| 1 | 1 | $L_A + 3L_D/8$ |

In this case, the same circuit arrangement as in FIG. 11 can be used for decoding by using Table 4. However, another arrangement to be described below may be adapted.

The image signal is represented by one gray scale level for $L_D \leq T_1$. If $T_1 < L_D < T_2$ is established, the image signal is represented by two gray scale levels. If $T_2 < L_D$ is established, the image signal is represented by four gray scale levels. The coded signals for $L_A$, $L_D$, $a_1$, and $a_2$ are sent for every q lines (q is a multiple of m).

At the receiving end, an image signal memory for storing data of q lines is prepared, and decoding is performed in the following procedures.

(1) If the coded signal of $L_A$ is received, the signal is decoded according to Table 1 to calculate the reference level $L_A$. The value of $L_A$ is stored for picture elements in each block. This image signal is given as $S_0$.

In this case, the identical value $S_0$ is stored for the picture elements of the same block.

(2) If the coded signal of $L_D$ is received, this signal is decoded and the decoded result is temporarily stored in the difference value memory.

(3) If the coded signal of $a_1$ is received, it is decoded to calculate the logic value (i.e., "1" or "0") of $a_1$ and the following hypothetical operations are performed:

(i) if $L_D \leq T_1$, then $S_1 = S_0$ (ii) if $L_D > T_1$ and if $a_1 = 1$, then $S_1 = S_0 + L_D/4$ or if $L_D > T_1$ and if $a_1 = 0$, then $S_1 = S_0 - L_D/4$.

In this manner, the value $S_1$ is calculated, and the value $S_0$ in the image signal memory is updated to the alue $S_1$.

(4) If the coded signal of $a_2$ is received, the coded signal is decoded to obtain the logic level ("1" or "0") of $a_2$. In this case, the $S_2$ value is calculated under the following conditions and the $S_1$ value in the image signal memory is replaced with the calculated $S_2$ value.

(i) if $L_D \leq T_2$, then $S_2 = S_1$ (ii) if $T_2 < L_D$ and if $a_2 = 1$, then $S_2 = S_1 + L_D/8$ or if $T_2 < L_D$ and if $a_2 = 0$, then $S_2 = S_1 - L_D/8$.

(5) If other bits such as $a_3$, $a_4$, ... are present, approximated values $S_3$, $S_4$, ... thereof are sequentially calculated.

With the above principle, if a q-line memory circuit, a difference value memory, and an arithmetic unit for calculating $S_0 \pm (\frac{1}{4})L_D$ and $S_1 \pm (\frac{1}{8})L_D$ are arranged, decoding can be performed, thereby greatly simplifying the decoding apparatus. In addition, if the predetermined value q is given for all scanning lines of one frame, the overall general information can be detected by only the signal $S_0$ obtained by decoding the coded signal of the reference level $L_A$. Upon addition of the signal $a_1$, an image $S_1$ with considerably high quality can be reproduced. Upon reception of the signal $a_2$, an image $S_2$ with very high quality can be reproduced. Even if the image signal is not entirely received, i.e., even if part of the image signal is received, the general information can be known.

As is apparent from the circuit arrangements of FIGS. 2, 7, and 9, no multipliers are used to embody the present invention. A plurality of adders and subtracters do not complicate the circuit arrangement, so that high-speed processing can be achieved. Furthermore, the image signal is divided into three components and the components are independently coded. Therefore, high-efficient coding schemes can be selected according to the statistics of data constituting these components. As a result, coding efficiency can be advantageously improved.

Another advantage is in that partial or general information of the original image can be easily extracted. In a conventional coding scheme, all codes must be coded even if only character information or continuous tone information is to be detected.

According to the present invention, however, an information component representing a continuous tone image and an information component representing a portion whose primary importance is a resolution can be extracted separately. Therefore, partial information can be easily extracted. For example, in order to display general information of a continuous tone picture from image signals stored in an image file, only the reference level components of the picture elements are decoded, and the decoded signals are displayed. Although the resolution becomes 1/m, an image with good legibility can be obtained. If character information is required but not gray scale information, only the level designating signals of the picture elements are decoded. In particular, if the original image is coded by bit plane coding as described in the previous embodiments, only the MSB is decoded to obtain binary line drawing with high quality.

According to the coding method of the present invention, if attributes of the original image are known, some of the information components can be further omitted. Assume that an original includes characters and pictures. In this case, the components excluding the level designating signal are not important in the character area, and the less important components may be omitted. Alternatively, the less important components may be replaced with a constant regardless of the value of the original image, thus achieving higher efficiency. Furthermore, the number of gray scale levels can be reduced. Finally, the level designating signal can be displayed on the bit plane according to its MSB. In this case, legibility of the reproduced image poses substantially no problems.

A case will be described wherein the reference level and the level difference are respectively replaced with constants in the character area.

If a picture area is decoded such that a reference level $L_A$ is $L_{max}$ and a level difference is $L_D = L_{max} - L_{min}$, a character area is decoded such that $L_A$ = white level (i.e., the maximum value in the dynamic range) and the level difference is (white level - black level), i.e., the full dynamic range. In this case, the decoded image of the character area has higher black-and-white contrast as compared with the original image. However, image quality is not degraded. The image quality is often rather improved by an increase in black-and-white contrast.

The correlation between the blocks is increased for the same number of codes, and thus the number of codes can be reduced to apparently achieve same high efficiency of coding. The above technique may be effectively used not only for the case wherein the attributes of the image area are known in advance, but also for the case wherein the difference between the maximum and minimum values of the signal level of the intrablock picture element is larger than a predetermined value, the case wherein an image area is automatically discriminated as a character area, or the case wherein the omissions described above are performed and the original image signal components are replaced with the constants.

In the above embodiment, the level designating signal represents levels expressed generally $2^k$ ($k = 0, 1, 2, \ldots$) such as 1, 2, 4, and 8. However, the gray scale representation may be any integer such as 3 or 5. In particular, if the gray scale levels are ($L_D + 1$), i.e., the level difference plus one, the original image can be coded or decoded without omitting its components.

In the above embodiment, one block consists of $4 \times 4$ picture elements, i.e., 16 picture elements. However, one block may be of any matrix of $8 \times 8$, $4 \times 8$, or $16 \times 16$.

In an area (e.g., a character area or a line image area) and an area discriminated to be the character or line image area, all of which do not require continuous tone representation as their primary importance, one of or both the reference level and the level difference, i.e., at least one thereof, may be replaced with the corresponding constants or omitted.

In an area of characters and line images whose primary importance is not continuous tone representation and level designating signal is represented on the bit plane, the number of bits on the bit plane may be smaller than the area of the continuous tone picture.

According to the coding method of the present invention as described above, the gray scale information of each block is divided into (1) the reference level, (2) the level difference, and (3) level designating signal. These components are independently coded, and thus coding with high efficiency can be achieved. At the same time, partial or general information can be easily extracted. Furthermore, complicated arithmetic operations are not required, and thus high-speed processing can be achieved. In addition, the parameters may be varied complying with the visual sensitivity according to the level difference, and information of a specific portion corresponding to some attribute can be easily omitted. Therefore, image quality and the number of codes can be varied by proper selection of parameters.

The coding apparatus of the present invention basically includes a memory, a comparator, an arithmetic circuit, and coding circuits. Therefore, a simple circuit arrangement allows realization of the coding method of the present invention. Furthermore, the maximum and minimum values can be calculated by the comparator, and high-speed coding can be achieved with a simple arrangement.

What is claimed is:

1. A coding method comprising the steps of
   dividing an image into a plurality of blocks each consisting of a plurality of intrablock picture elements,
   dividing gray scale information of each intrablock picture element into three components:
   (1) a reference level representing a position of a signal level of an intrablock picture element in a whole dynamic range of gray scale representation;
   (2) a level difference representing a distribution range of the signal levels of the intrablock picture elements; and
   (3) a level designating signal representing a level of each intrablock picture element within the distribution range, and
   independently coding the three components.

2. A method according to claim 1, wherein the reference level is a minimum value of the signal level of each intrablock picture element, and the level difference is the difference between the minimum value and a maximum value of the signal level of each intrablock picture element.

3. A method according to claim 1, wherein the reference level is an average value of a sum of maximum and minimum values of the signal level of each intrablock picture element, and the level difference is an average value of a difference between the maximum and minimum values of the signal level of each intrablock picture element.

4. A method according to claim 1, wherein the level designating signals represent levels determined at equal intervals between maximum and minimum values based on the maximum and minimum values and the number of levels represented by the level designating signals.

5. A method according to claim 1, wherein the level designating signals represent levels nonlinearly determined between the maximum and minimum values based on the maximum and minimum values and a distribution state of levels represented by the signal levels of the intrablock picture elements.

6. A method according to claim 1, wherein the blocks are classified into f block groups $B_1, B_2, \ldots B_f$ in order of smaller intrablock level differences, a number of levels represented by level designating signals for the picture elements belonging to the block group $B_1$ having the smallest level difference is defined by $n_1$ gray scale levels and a number of levels represented by level designating signals for the picture elements belonging to a jth ($j = 1, 2, \ldots f$) block group having a jth level difference is defined by $n_j$ gray scale levels based on the number of levels $n_1, n_2, \ldots n_f$ satisfying the relation $n_1 < n_2 < \ldots < n_f$.

7. A method according to claim 1 or 6, wherein at least one of the reference level and the level difference is replaced with a corresponding constant for a block whose primary importance is not continuous tone representation.

8. A method according to claim 1 or 6, wherein at least one of the reference level and the level difference is omitted for a block whose primary importance is not continuous tone representation.

9. A method according to claim 1 or 6, wherein a number of bit planes is smaller than that of picture elements of a block of a continuous tone picture in a block whose level designating signal is represented on a bit plane and whose primary importance is not continuous tone representation.

10. A coding apparatus comprising:
a memory for dividing an image into blocks each consisting of a plurality of intrablock picture elements;
a comparator for calculating maximum and minimum values of a signal level of each intrablock picture element in units of blocks;
an arithmetic circuit for setting quantization levels between the maximum and minimum values;
a first coding circuit for coding a reference level derived from the signal level of each intrablock picture element in units of blocks;
a second coding circuit for coding a level difference derived from the signal level of each intrablock picture element; and
a third coding circuit for coding a level designating signal representing a correspondence between a corresponding picture element and one of the quantization levels.

11. A coding apparatus comprising:
means for dividing an image into blocks each consisting of a plurality of intrablock picture elements;
means for calculating and storing a maximum value of the signal level of each intrablock picture element in units of blocks;
means for calculating and storing a minimum value of the signal level of each intrablock picture element in units of blocks;
first coding means for setting a reference level in units of blocks based on the signal level of each intrablock picture element and coding the reference level;
second coding means for setting a level difference in units of blocks based on the signal level of each intrablock picture element; and
third coding means for setting quantization levels between the maximum and minimum values in units of blocks, discriminating a corresponding one of the quantization levels for each intrablock picture element, and coding a level designating signal representing the discriminated quantization level.

12. An apparatus according to claim 11, wherein said first coding means comprises arithmetic means for calculating a difference $\Delta L$ between a reference level $LA(j)$ of a jth block and a reference level $LA(j-1)$ of a $(j-1)$th block, and code generating means for variable-length coding of the difference $\Delta L$.

13. An apparatus according to claim 11, wherein said first coding means comprises means for preparing a plurality of reference levels for each block based on the signal levels of the intrablock picture elements, and selecting means for selecting one of the plurality of reference levels according to a difference between the maximum and minimum values.

14. An apparatus according to claim 11, wherein said second coding means comprises arithmetic means for calculating a difference between the maximum value stored in the maximum value storing means and the minimum value stored in the minimum value storing means, and code generating means for variable-length coding of the difference between the maximum and minimum values.

15. An apparatus according to claim 11, wherein said second coding means comprises means for preparing a plurality of level differences for each block based on a difference between the maximum and minimum values, and selecting means for selecting one of the plurality of level differences according to the difference between the maximum and minimum values.

16. An apparatus according to claim 11, wherein said third coding means comprises means for setting the quantization levels at equal intervals between the maximum and minimum values based on the maximum value stored in said maximum value storing means and the minimum value stored in said minimum value storing means.

17. An apparatus according to claim 11, wherein said third coding means comprises threshold calculating means for calculating a threshold value for setting the quantization levels based on the signal levels of the intrablock picture elements, means for storing the threshold value q, comparing means for comparing each block image signal output from said memory means with the threshold value q of the corresponding block which is read out from said threshold storage means, and means for binary coding an output from said comparison means.

18. An apparatus according to claim 11, wherein said third coding means comprises means for discriminating which one of the f block groups $B_1, B_2, \ldots B_f$ ordered from smaller intrablock level differences corresponds to each block and for controlling selection of a comparison output signal supplied from the comparing means to a coding circuit based on a discrimination output so as to obtain intrablock level designating signals which represent the numbers of levels given as $n_1, n_2, \ldots n_f$ assigned to the block groups $B_1, B_2, \ldots B_f$.

19. An apparatus according to claim 18, wherein said block groups are classified into first and second block groups wherein $f=2$, the first block group being coded by one gray scale level, and the second block group being coded by two gray scale levels.

20. An apparatus according to claim 18, wherein said block groups are classified into first, second, and third block groups wherein $f=3$, the first block group being coded by one gray scale level, the second block group being coded by two gray scale levels, and the third block group being coded by four gray scale levels.

21. An apparatus according to claim 18, wherein if the discriminated one of the f block groups is to be coded by one gray scale level, the reference level coded by said first coding means is an average value $L_{AVE}$ of picture element levels in each block, and at the same time the level difference coded by said second coding means is set to be zero.

22. An apparatus according to claim 18, wherein if the discriminated one of the f block groups is to be coded by two gray scale levels, the threshold value compared with the image signal by said comparing means of said third coding means is an average value $L_{AVE}$ of picture element levels of each block.

23. An apparatus according to claim 17, wherein said threshold value calculating means calculates the threshold value for setting the quantization levels on the basis of the maximum and minimum values $L_{max}$ and $L_{min}$ stored in said maximum and minimum value storing means according to equation $l = L_{min} + (q/n)(L_{max} - L_{min})$ for $q = 1, 2, \ldots (n-1)$ where n is the number of quantization levels.

24. An apparatus for decoding a time-serial code string obtained by independently coding three components of gray scale information of each intrablock picture element, the gray scale information consisting of (1) a reference level representing a position of a signal level of an intrablock picture element in a whole dynamic range of gray scale representation, (2) a level difference representing a distribution range of the signal levels of the intrablock picture elements, and (3) a level designating signal representing a level of each intrablock picture element within the distribution range, comprising:

coding control means for separating the code string into the three components and independently outputting the three components;

first decoding means for decoding a coded reference level output from said code control means;

first storage means for storing a reference level signal decoded by said first decoding means;

second decoding means for decoding the coded level difference output from said code control means;

second storage means for storing a level difference signal decoded by said second decoding means;

third decoding means for decoding a coded level designating signal output from said code control means;

signal converting means for converting the reference level signal stored in said first storage means according to the level designating signal decoded by said third decoding means;

level number discriminating means for discriminating the number of levels represented by the level designating signals; and means for controlling a content of a signal converted by said signal converting means according to an output from said level number discriminating means.

25. An apparatus for decoding a time-serial code string obtained by independently coding three components of gray scale information of each intrablock picture element, the gray scale information consisting of (1) a reference level representing a position of a signal level of an intrablock picture element in a whole dynamic range of gray scale representation, (2) a level difference representing a distribution range of the signal levels of the intrablock picture elements, and (3) a level designating signal representing a level of each intrablock picture element within the distribution range, comprising:

coding control means for separating the code string into the three components and independently outputting the three components;

first decoding means for decoding a coded reference level output from said code control means;

second decoding means for decoding a coded level difference output from said code control means;

third decoding means for decoding a coded level designating signal output from said code control means;

signal generating means for generating quantization levels according to a reference level signal decoded by said first decoding means and a level difference signal decoded by said second decoding means; and means for selecting one of signals output from said signal generating means in response to the level designating signal decoded by said third decoding means.

* * * * *